P. CUDAHY.
Lard-Cooler.
No. 220,811.    Patented Oct. 21, 1879.
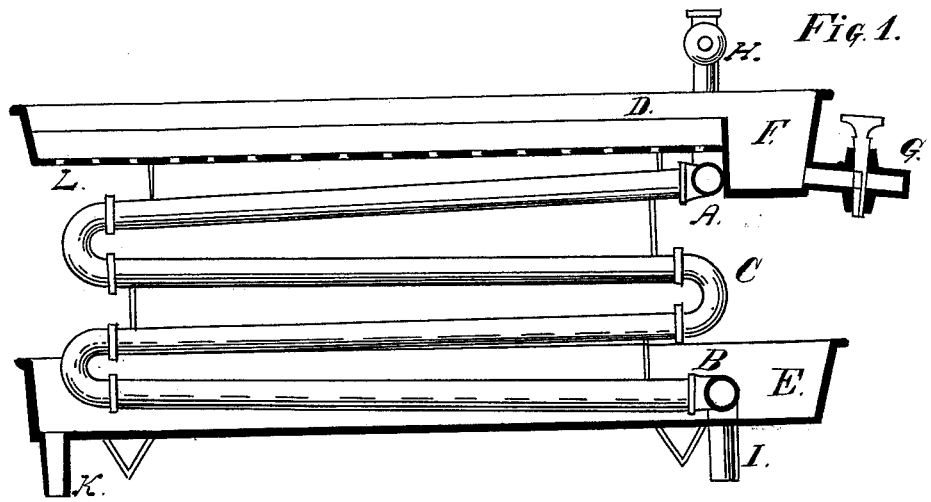
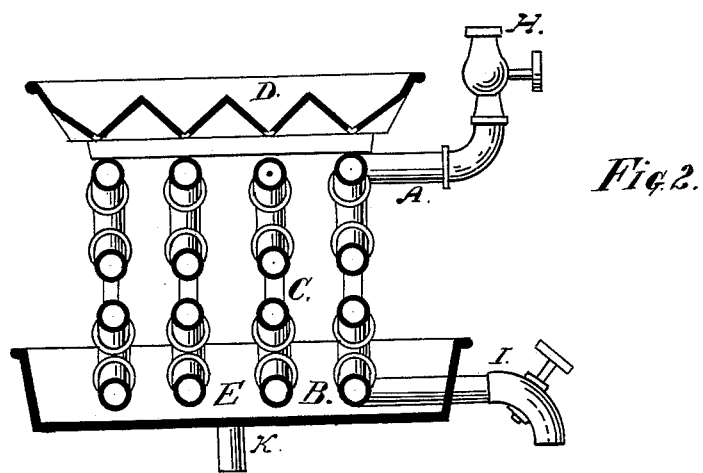
WITNESSES:
INVENTOR:
Patrick Cudahy

UNITED STATES PATENT OFFICE.

PATRICK CUDAHY, OF MILWAUKEE, WISCONSIN.

IMPROVEMENT IN LARD-COOLERS.

Specification forming part of Letters Patent No. 220,811, dated October 21, 1879; application filed November 2, 1878.

*To all whom it may concern:*

Be it known that I, PATRICK CUDAHY, of Milwaukee, in the county of Milwaukee, in the State of Wisconsin, have invented certain Improvements in the Clarification, Filtering, and Cooling of Lard, of which the following is a specification.

My invention relates to devices for cooling lard; and it consists in the device to be hereinafter more fully described.

Figure 1 is a longitudinal section of my invention, and Fig. 2 a transverse section of the same.

A and B are a couple of headers, with which the pipes C are connected. D is a pan, having a bottom composed of a series of troughs or corrugations, which, at their lower points, are perforated, as at L. Along one end I provide this pan D with a trough or depression, F, which falls considerably lower than the bottom of the pan, while its inner edge extends only to the level of the highest points of the corrugations in the pan D, which is to be placed over a series of pipes, C, in such a manner that each series of holes L will be directly over one of the pipes. Below the pipes I place any suitable receptacle, E, to catch the material as it drips from the pipes.

As the heated liquid flows into the trough F from the pipe G it rises until, overflowing the inner edge of the trough F, it is distributed in the pan, from whence it falls through the perforations L upon the cooling-pipes.

It will be perceived that by this construction all of the sediment will be caught by the trough F, and only the pure liquid allowed to flow over into the pan proper; and this is an important feature of my invention, for if it flowed directly onto the pan from the pipes, the sediment would soon stop up the perforations L and prevent the liquid from flowing down upon the pipes.

Another important feature is the corrugated or troughed bottom of the pan E, which guides the liquid to the perforations, so that the pan will be entirely drained every time it is used.

It is also important that the inner edge of the trough F should stop short of the rim of the pan, for if it extended up even with it, and was perforated to allow the liquid to strain through it, the perforations would be liable to clog, and a continued flow from the tank would cause the liquid to flow over the rim of the pan, occasioning a waste of material and injury to the premises.

What I claim is—

The combination of the pan D, having the trough F and a corrugated bottom, perforated as shown, with a series of water-pipes situated beneath it, substantially as described.

PATRICK CUDAHY.

Witnesses:
J. B. SMITH,
ADAM KEMPER.